United States Patent
Conn et al.

(10) Patent No.: US 10,267,130 B2
(45) Date of Patent: Apr. 23, 2019

(54) CONTROLLING OPERATION OF A STEAM-ASSISTED GRAVITY DRAINAGE OIL WELL SYSTEM BY ADJUSTING CONTROLS TO REDUCE MODEL UNCERTAINTY

(71) Applicant: International Business Machines Corporation, Armonk, NY (US)

(72) Inventors: Andrew R. Conn, Mount Vernon, NY (US); Lior Horesh, North Salem, NY (US); Matthias Kormaksson, Rio de Janeiro (BR); Moshood O. Saliu, Calgary (CA); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 15/276,168

(22) Filed: Sep. 26, 2016

(65) Prior Publication Data

US 2018/0087358 A1 Mar. 29, 2018

(51) Int. Cl.
*E21B 43/24* (2006.01)
*G05B 13/02* (2006.01)

(52) U.S. Cl.
CPC ...... *E21B 43/2406* (2013.01); *G05B 13/0275* (2013.01)

(58) Field of Classification Search
CPC ............. E21B 43/2406; E21B 41/0092; G05B 13/0275
(Continued)

(56) References Cited

U.S. PATENT DOCUMENTS 6,257,334 B1 7/2001 Cyr et al.
7,879,768 B2 2/2011 Wu
(Continued)

FOREIGN PATENT DOCUMENTS

CN 203905930 U 10/2014

OTHER PUBLICATIONS

Neural Network Meta-Modeling of Steam Assisted Gravity Drainage Oil Recovery Processes, By: Alali, Najeh, vol. 29, No. 3 (Year: 2010).*

(Continued)

*Primary Examiner* — Robert E Fennema
*Assistant Examiner* — Jigneshkumar C Patel
(74) *Attorney, Agent, or Firm* — Vazken Alexanian; Ryan, Mason & Lewis, LLP

(57) ABSTRACT

A method for increasing efficiency in emulsion production for a steam-assisted gravity drainage (SAGD) oil well system includes generating a model of the SAGD oil well system and training the model of the SAGD oil well system utilizing historical time series data relating to one or more SAGD oil wells at one or more SAGD production sites of the SAGD oil well system. The historical time series data is obtained from a plurality of sensors in the SAGD oil well system. The method also includes determining an uncertainty of the model as a function of a control space of the model and utilizing the model to determine values for control variables associated with one or more of the SAGD production sites of the SAGD oil well system which reduce the model uncertainty while meeting one or more objectives subject to one or more constraints. The method further includes adjusting a set of controls of the SAGD oil well system based on the determined values for the control variables.

20 Claims, 6 Drawing Sheets

(58) Field of Classification Search
USPC ........................................................ 700/282
See application file for complete search history.

(56) References Cited

U.S. PATENT DOCUMENTS

| | | | |
|---|---|---|---|
| 8,146,669 B2 | 4/2012 | Mason | |
| 8,756,019 B2 | 6/2014 | Pimenov et al. | |
| 8,849,639 B2 | 9/2014 | Brown et al. | |
| 8,977,502 B2 | 3/2015 | Liu | |
| 9,043,189 B2 | 5/2015 | Wallace et al. | |
| 9,085,958 B2 | 7/2015 | Laing et al. | |
| 9,163,497 B2 | 10/2015 | Laing et al. | |
| 9,803,469 B2 | 10/2017 | Kaiser et al. | |
| 2006/0095872 A1 | 5/2006 | McElvain et al. | |
| 2007/0055392 A1 | 3/2007 | D'Amato et al. | |
| 2011/0060572 A1 | 3/2011 | Brown | |
| 2011/0288778 A1 | 11/2011 | Pavlovich et al. | |
| 2012/0024524 A1* | 2/2012 | Marsimovich | E21B 43/16 166/254.1 |
| 2012/0059640 A1 | 3/2012 | Roy et al. | |
| 2013/0105147 A1 | 5/2013 | Scott | |
| 2013/0175030 A1 | 7/2013 | Ige et al. | |
| 2013/0277049 A1 | 10/2013 | Liu | |
| 2014/0124194 A1* | 5/2014 | Jorshari | E21B 43/2406 166/245 |
| 2014/0216732 A1 | 8/2014 | Stone et al. | |
| 2014/0216739 A1* | 8/2014 | Brown | E21B 43/2408 166/272.3 |
| 2014/0352966 A1 | 12/2014 | Yuan | |
| 2015/0009499 A1 | 1/2015 | Lin et al. | |
| 2015/0161304 A1 | 6/2015 | Vachon | |
| 2015/0198022 A1 | 7/2015 | Stanecki et al. | |
| 2015/0354336 A1 | 12/2015 | Maurice et al. | |
| 2016/0032692 A1* | 2/2016 | Conn | E21B 41/0092 700/275 |
| 2016/0054713 A1* | 2/2016 | Foss | E21B 43/00 700/282 |
| 2016/0098502 A1 | 4/2016 | Havre et al. | |
| 2016/0201453 A1 | 7/2016 | Kaiser et al. | |
| 2016/0245065 A1 | 8/2016 | Gray et al. | |
| 2016/0251957 A1 | 9/2016 | Mcewen-King et al. | |
| 2016/0312592 A1 | 10/2016 | Chen et al. | |
| 2016/0312599 A1* | 10/2016 | Adam | E21B 43/00 |
| 2017/0051597 A1 | 2/2017 | Akiya et al. | |
| 2017/0177992 A1 | 6/2017 | Klie | |
| 2017/0336811 A1 | 11/2017 | Stone et al. | |
| 2017/0350217 A1 | 12/2017 | Paul et al. | |
| 2017/0351227 A1* | 12/2017 | Paul | G05B 13/042 |

OTHER PUBLICATIONS

Weight Uncertainty in Neural Networks: Proceedings of the 32nd International Conference on Machine learning, Lille, France, 2015, JMLR: W & CP vol. 37, By: Charles Blundell (Year: 2015).*

N.V. Queipo et al., "Surrogate Modeling-Based Optimization of SAGD Processes," Journal of Petroleum and Science Engineering, Jul. 2002, pp. 83-93, vol. 35, Nos. 1-2.

ip.com, "Methods for SAGD Optimization," IP.com No. IPCOM000213572D, Dec. 21, 2011, 10 pages.

H.X. Nguyen et al., "Experimental Design to Optimize Operating Conditions for SAGD Process," Society of Petroleum Engineers (SPE), SPE Asia Pacific Oil & Gas Conference and Exhibition, SPE 145917, Sep. 2011, 11 pages, Jakarta, Indonesia.

Dennis Denney, "Real-Time Optimization of SAGD Operations," Society of Petroleum Engineers, Journal of Petroleum Technology (JPT), Jun. 2013, pp. 126-128, vol. 65, No. 6.

Shin et al., "Review of Reservoir Parameters to Produce SAGD and Fast-SAGD Operating Conditions," Journal of Canadian Petroleum Technology (JCPT), Jan. 2007, pp. 35-41, vol. 46, No. 1.

English translation for China Application No. CN203905930U.

List of IBM Patents or Patent Applications Treated as Related.

N. Alali et al., "Neural Network Meta-Modeling of Steam Assisted Gravity Drainage Oil Recovery Processes," Iranian Journal of Chemistry & Chemical Engineering, vol. 29, No. 3, Sep. 2010, pp. 109-122.

C. Blundell et al., "Weight Uncertainty in Neural Networks," 2015, 10 pages.

* cited by examiner

100

CONTROLLING OPERATION OF A STEAM-ASSISTED GRAVITY DRAINAGE OIL WELL SYSTEM BY ADJUSTING CONTROLS TO REDUCE MODEL UNCERTAINTY

CROSS-REFERENCE TO RELATED APPLICATIONS

The present application is related to commonly-assigned U.S. patent application Ser. No. 15/276,152, entitled "Controlling Operation of a Steam-Assisted Gravity Drainage Oil Well System Utilizing Continuous and Discrete Control Parameters," to commonly-assigned U.S. patent application Ser. No. 15/276,178, entitled "Controlling Operation of a Steam-Assisted Gravity Drainage Oil Well System by Adjusting Multiple Time Step Controls," and to commonly-assigned U.S. patent application Ser. No. 15/276,189, entitled "Controlling Operation of a Steam-Assisted Gravity Drainage Oil Well System by Adjusting Controls Based on Forecast Emulsion Production," which are filed concurrently herewith and incorporated by reference herein.

BACKGROUND

The present application relates to operation, and more specifically, to controlling operation of a steam-assisted gravity drainage (SAGD) oil well system. SAGD is a shale oil production methodology. In a SAGD oil well system, also referred to herein as a SAGD system, steam is injected through one or more injector wells and oil is extracted through one or more producer wells. Generally, injector wells and producer wells are arranged in pairs. A group of such well pairs may be organized as a pad or SAGD production site, such as a pad including six well pairs.

SUMMARY

Embodiments of the invention provide techniques for modeling a SAGD oil well system and adjusting controls of the SAGD oil well system to reduce uncertainty associated with the model of the SAGD oil well system.

For example, in one embodiment, a method for increasing efficiency in emulsion production for a SAGD oil well system comprises generating a model of the SAGD oil well system and training the model of the SAGD oil well system utilizing historical time series data relating to one or more SAGD oil wells at one or more SAGD production sites of the SAGD oil well system. The historical time series data is obtained from a plurality of sensors in the SAGD oil well system. The method also comprises determining an uncertainty of the model as a function of a control space of the model and utilizing the model to determine values for control variables associated with one or more of the SAGD production sites of the SAGD oil well system which reduce the model uncertainty while meeting one or more objectives subject to one or more constraints. The method further comprises adjusting a set of controls of the SAGD oil well system based on the determined values for the control variables. The method is performed by at least one processing device comprising a processor coupled to a memory, the processing device being operatively coupled to the SAGD oil well system.

In another embodiment, a computer program product for increasing efficiency in emulsion production for a SAGD oil well system comprises a computer readable storage medium for storing computer readable program code. The computer readable program code, when executed, causes a computer to generate a model of the SAGD oil well system and to train the model of the SAGD oil well system utilizing historical time series data relating to one or more SAGD oil wells at one or more SAGD production sites of the SAGD oil well system. The historical time series data is obtained from a plurality of sensors in the SAGD oil well system. The computer readable program code, when executed, also causes the computer to determine an uncertainty of the model as a function of a control space of the model and to utilize the model to determine values for control variables associated with one or more of the SAGD production sites of the SAGD oil well system which reduce the model uncertainty while meeting one or more objectives subject to one or more constraints. The computer readable program code, when executed, further causes the computer to adjust a set of controls of the SAGD oil well system based on the determined values for the control variables.

In another embodiment, an apparatus for increasing efficiency in emulsion production for a SAGD oil well system comprises a memory and a processor coupled to the memory. The processor is configured to generate a model of the SAGD oil well system and to train the model of the SAGD oil well system utilizing historical time series data relating to one or more SAGD oil wells at one or more SAGD production sites of the SAGD oil well system. The historical time series data is obtained from a plurality of sensors in the SAGD oil well system. The processor is also configured to determine an uncertainty of the model as a function of a control space of the model and to utilize the model to determine values for control variables associated with one or more of the SAGD production sites of the SAGD oil well system which reduce the model uncertainty while meeting one or more objectives subject to one or more constraints. The processor is further configured to adjust a set of controls of the SAGD oil well system based on the determined values for the control variables.

DETAILED DESCRIPTION

Figure 1:
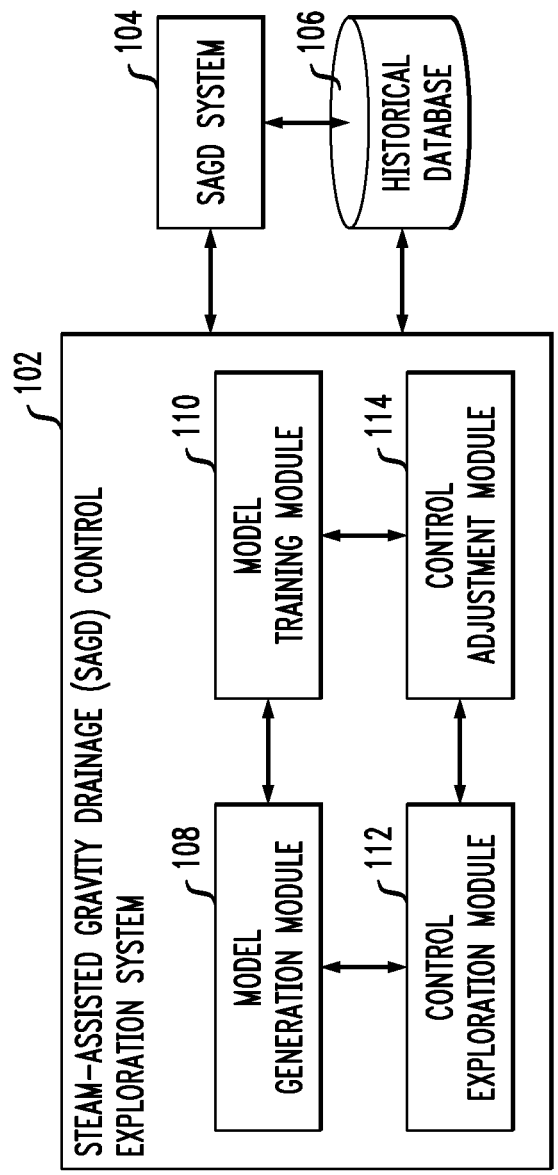
FIG. 1 depicts a system for controlling operation of a SAGD system by adjusting controls to reduce model uncertainty, according to an embodiment of the present invention.

Illustrative embodiments of the invention may be described herein in the context of illustrative methods, systems and devices for controlling operation of a SAGD oil well system to increase efficiency in emulsion production by adjusting controls of the SAGD oil well system to reduce model uncertainty. However, it is to be understood that embodiments of the invention are not limited to the illustrative methods, systems and devices but instead are more broadly applicable to other suitable methods, systems and devices.

While various illustrative embodiments are described below in the context of a SAGD oil well system, embodiments are not necessarily limited solely to use with SAGD systems. Instead, the techniques described herein may be used for other types of oil production systems and other types of systems that may benefit from the use of continuous and discrete control parameters in physics-based predictive modeling.

SAGD, as mentioned above, is a non-conventional oil production methodology. SAGD refers to a method of extracting bitumen from oil sands. In some arrangements, steam is injected under pressure into one of two parallel horizontal wells, referred to herein as an injector well, to heat the surrounding earth. Heating the earth reduces a viscosity of the bitumen contained in the oil sands, allowing the bitumen to flow under gravity. The bitumen is heated until it flows through porous rock. As an example, it may take a few months to heat the earth to a sufficient temperature, such as 150° C., so that the bitumen will flow under gravity. The flow of bitumen and water condensate is collected and extracted from the other of the two parallel horizontal wells, referred to herein as a producer well. Generally, the producer well is lower or deeper in the earth relative to the injector well. Individual wells, such as the injector and/or producer well, may be slotted and/or valved to facilitate optimal extraction of bitumen from the oil sands.

The two parallel horizontal wells form a well pair. A SAGD production site or pad may include multiple well pairs. For example, a pad may be arranged as a square of concrete with six well pairs. A SAGD system may include multiple pads or production sites, as will be described in further detail below.

The proportion of bitumen in the emulsion for a given SAGD well pair will typically increase over time as the earth is heated. In some cases, a ratio of 2:1 between water and bitumen is considered a good ratio. Various factors may affect the emulsion rate and this ratio, including but not limited to the history of the well, temperature, porosity, the amount of bitumen in the surrounding earth, etc.

Operation of a SAGD system may involve several controls, including but not limited to the rate of steam injected, steam allocation to various sites and/or well pairs, gas casing pressure, extracted emulsion pressure, etc. The SAGD system may be instrumented with a number of sensors that provide at least partial information regarding a state of the SAGD system. Observables which may be measured using such sensors include but are not limited to emulsion rate, temperature profile along the length of a well, sub-cool profile, bottom hole pressure, gas blanket pressure, steam injection surface pressure, etc.

As one non-limiting example, consider a well pair in a SAGD system, wherein the surface pressure injection for the injector well is 2500 kiloPascals (kPa) for the casing and 3200 kPa for the tubing. The pressure will gradually be reduced as a steam chamber develops around the injector well. The bottom hole pressure of the injector well may be, for example, 2700 kPa, while the toe steam pressure in the injector well may by 2600 kPa. For the producer well, the bottom hole pressure may be 2600 kPa, with a tubing heel pressure of 2400 kPa and a tubing toe pressure of 2500 kPa. The surface production pressure, or the extracted emulsion pressure, may be in the range of 400-1000 kPa. The injector and producer wells of a well pair may have a horizontal length in the range of 500 to 1000 meters (m). The vertical distance between the injector and producer well may be approximately 5 m. The oil sands layer may begin 250 to 300 m or more from the surface. For example, a cap rock layer of shale and glacial till may range in thickness above the oil sands layer of the earth. The injector and producer well would thus have a vertical distance from the surface exceeding the thickness of the cap rock layer, which as mentioned above may be in the range of 250 to 300 m.

Costs in a SAGD system may be dominated by the cost of heating the steam relative to the amount of bitumen extracted. Greater steam injection rates generally increase the heat and amount of bitumen recovery, but are subject to constraints and in some cases diminishing returns. Such constraints include but are not limited to the need to keep the pressure in a well below the amount that would cause damage to the well or breach the overburden, avoiding conditions that would ingest steam into a producer well, etc.

A SAGD system may include a field with a number of production sites and many different well pairs. The SAGD system, however, will often have a finite amount of steam to distribute. The decision of how to best distribute the steam to different production sites and well pairs is an optimization problem. In some cases, a brokerage system may be used, where different well pairs or production sites provide estimates of the amount of bitumen that may be extracted day to day and steam is allocated based on such estimates.

A key challenge in SAGD operation is to determine an optimal set of controls that maximize or increase the yield of the system while honoring operational constraints. Maximizing or increasing yield may include maximizing or increasing emulsion rate, minimizing or reducing a cumulative steam to oil ratio in the emulsion, maximizing or increasing a net present value, etc. Operational constraints may include certain upper bounds on pressure such as bottom hole pressure, certain bounds on temperature such as minimum temperatures at different locations along injector and/or producer wells, sub-cool thresholds, etc.

Physics based predictive models may be difficult to generate in a cost-effective manner. For example, each well pair may be subject to different geology and bitumen environments. Thus, a detailed physical model of a well pair may require prescription of model parameters everywhere at all times, leading to great uncertainty. Physics based models may also require the prescription of a large number of "nuisance" parameters, such as porosity, permeability, heat coefficients throughout a field, etc. The nuisance parameters are so named to indicate that they are cost prohibitive or to indicate that there are no definitive means for determining such parameters in a real-world setting. As a consequence, ad-hoc or often generic values may be prescribed.

Such ad-hoc assignment of values may lead to biased predictions, as the values assigned may not properly distinguish the specific characteristics of individual wells, and therefore may fail to provide high fidelity results. In addition, some of the underlying multi-physics phenomena of SAGD systems are not fully realized thus further limiting the effectiveness of physics based predictive models. For example, the underlying physics of a SAGD system is complex, involving heat transfer (diffusion and advection), flow in a porous medium, various chemical processes, etc. Physics based predictive modeling may involve a number of simplifying assumptions that affect the accuracy of results. As an example, some models may treat well pairs as independent although this is not necessarily the case. Consider three well pairs arranged side by side. The left and right well pairs may be subject to more heating loss relative to the center well pair, which is shielded by the left and right well pairs. In addition, thermal communication between well pairs may result from channels through the rock or earth surrounding such well pairs.

Data driven or statistical approaches for modeling SAGD systems also suffer from disadvantages. For example, statistical methods may be agnostic to the underlying physical process, and thus their ability to offer reliable prediction is limited. In particular, as the underlying system is causal, a SAGD system is likely to respond differently to the same set of control inputs at different times. Such system behavior is difficult to model or cannot be modeled reliably, especially when little data is provided or available at an early stage of operation, in situations where values outside a training set are requested, or when long-term prediction is desired. In addition, statistical methods may require significant ramp-up time to accumulate sufficient data for training. Further, models may be tailored such that they are overly specific to one well pair and thus not generalizable to other well pairs.

Due to various limitations of standard predictive models in reliably predicting the response of a SAGD system for an extended duration, some optimization strategies may seek to prescribe a set of controls for optimizing production in just a single unit of time, such as for a single day. The subsurface dynamics of a SAGD system, as described above, may be of a complex multi-physics nature involving diffusion, advection, heat transfer, etc. that span across multi-scale time periods that extend beyond a single time unit such as a day. As such, there can be significant advantages in being able to choose parameters that maximize or increase emulsion production at minimum cost under various constraints that extend beyond a single time unit.

Optimization of the controls for a SAGD system is a process which relies on an ability to interface with a trustworthy predictive model, where the predictive model estimates quantities of interest relevant to one or more objectives or one or more constraints given a set of values for control variables. The fidelity of the predictive model of the SAGD system depends, at least in part, on the ability to determine accurately a broad set of parameters associated with the SAGD system, including parameters relating to a subsurface model of the SAGD system. Such parameters may include, by way of example, the permeability, porosity, thermal conductive coefficients, etc. of the subsurface model of the SAGD system. Often, such parameters need to be determined across large sections of a model and across time. Despite sensor instrumentation of an oil sands reservoir and SAGD system, typically only a small portion of such parameters are known with a high certainty with the remaining majority inferred or estimated based on geological considerations. Due to mis-specified estimation of such parameters, the predictions generated using a predictive model may be biased. As such, the ability to optimize the SAGD system can be significantly hampered.

Throughout a process of optimizing a model of a SAGD system, a better understanding of the model may be attained gradually as more data arrives from the sensors and other instrumentation in the reservoir. Such data may be used to further refine the predictive model. In some cases, a model may be considered greedy in that it always seeks instant gratification or optimal results for a current time. While this may improve one or more objectives in a short term, a greedy model may discount the value of information gained by exploring the response or sensitivity of the SAGD system to different input perturbations, e.g., different sets of values for control variables.

In some embodiments, these and other disadvantages are overcome at least in part by providing an optimization framework that balances exploration and exploitation of SAGD controls. In the first stages of operation, or in response to changes in the dynamics of a SAGD system, exploitation may be balanced with exploration to yield greater overall value on a long term time scale relative to a greedy approach that always seeks to maximize one or more objectives in the short term. Long term and short term, in this context, refer to optimization over several time steps and over a single or few time steps, respectively.

Using the techniques described herein, the selection of controls for SAGD system may be optimized or improved such that operation of the SAGD system may be controlled to increase the efficiency of emulsion production. Increasing the efficiency of emulsion production may include increasing emulsion output, reducing a water to oil or bitumen ratio of the emulsion, reducing an amount of steam required to achieve a given emulsion output, etc. Increased efficiency of emulsion production may be accounted for in the objectives used, further examples of which are described below.

FIG. 1 shows a system 100, including a SAGD control exploration system 102, SAGD oil well system 104 and historical database 106. Although not explicitly shown, the SAGD control exploration system 102, SAGD system 104 and historical database 106 may be connected or operatively coupled to one another possibly via one or more networks. The SAGD control exploration system 102 is configured to obtain sensor data from the SAGD system 104 and/or the historical database 106, and to utilize the sensor data and a model to adjust controls of the SAGD system 104 to reduce uncertainty in a model of the SAGD system 104. Details regarding a possible implementation of SAGD system 104 will be discussed in further detail below with respect to FIG. 2.

SAGD control exploration system 102 includes model generation module 108, model training module 110, control exploration module 112 and control adjustment module 114. The model generation module 108 is configured to generate a model of the SAGD system 104. The model may utilize various types of machine learning and neural networks, including various types of feed-forward neural networks including but not limited to nonlinear autoregressive exogenous model (NARX) neural networks. In some embodiments, other learning paradigms may be used including but not limited to support vector, boosted support vector and random forest classifiers. Some of these learning paradigms, such as random forest, provide an additional benefit of ranking control variables according to their relative influence on output variables. In some embodiments, these rankings or other information may be used to identify the degree of cross coupling in well pairs.

The model training module 110 is configured to train the model generated by the model generation module 108 utilizing historical time series data relating to the SAGD system 104. The historical time series data may be based on time series historical sensor data from different SAGD well pairs in the SAGD system 104. The historical time series data may be obtained by the SAGD control exploration system 102 from the SAGD system 104 itself or via historical database 106. The time series historical sensor data may include but is not limited to steam mass flow, temperature and pressure, emulsion mass flow, etc. The time series historical sensor data may also include data particular to one or both of the injector well and the producer well in a given well pair, such as temperature along the lengths of such wells or at intervals thereof, information such as net injected energy, integrated or current injected energy, net mass flow, integrated or current mass flow, etc.

Control exploration module 112 is configured to determine an uncertainty of the model generated by model generation module 108 as a function of a control space of the model. Various techniques for determining the model uncertainty will be described in further detail below. The control exploration module 112 is further configured to utilize the model generated by model generation module 108 and trained using model training module 110 to determine values for control variables associated with the SAGD system 104 that will reduce the model uncertainty while meeting one or more objectives subject to one or more constraints. A balance between reducing the model uncertainty while meeting the one or more objectives subject to the one or more constraints may be controlled using one or more weighting parameters. Values for the weighting parameters may be adjust over time to emphasize exploration or exploitation as will be described in further detail below. Control adjustment module 114 utilizes the determined values for the control variables to adjust controls of the SAGD system 104.

While FIG. 1 shows a system 100 wherein the SAGD control exploration system 102 is separate from the SAGD system 104, embodiments are not so limited. In some embodiments, the SAGD control exploration system 102 may be incorporated in or otherwise be part of the SAGD system 104. The historical database 106 may also be incorporated at least in part in one or both of the SAGD control exploration system 102 and SAGD system 104. Further, while system 100 shows SAGD control exploration system 102 connected to a single SAGD system 104, embodiments are not so limited. A single instance of the SAGD control exploration system 102 may be connected to or used to adjust controls of multiple distinct SAGD oil well systems in other embodiments. Also, while not explicitly shown in FIG. 1 the SAGD control exploration system 102 may be part of a cloud computing environment or other processing platform, as will be discussed in further detail below with respect to FIGS. 4-6.

Figure 2:
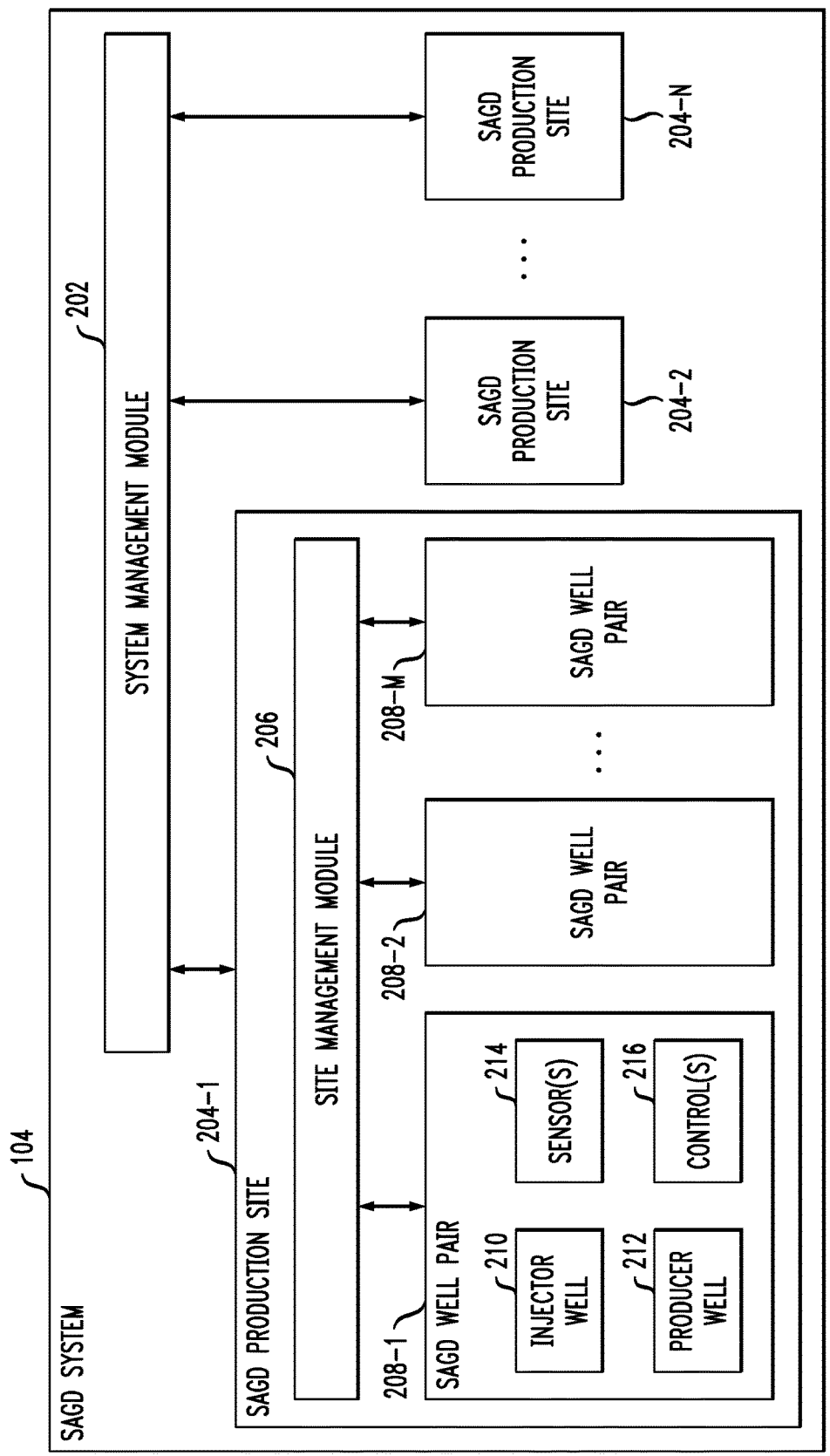
FIG. 2 depicts a detailed view of the SAGD system shown in FIG. 1, according to an embodiment of the present invention.

FIG. 2 shows a detailed view of an illustrative implementation of the SAGD system 104. As shown, the SAGD system 104 includes a system management module 202 and SAGD production sites 204-1, 204-2, ... 204-N collectively referred to herein as SAGD production sites 204. The system management module 202 may receive control information from the SAGD control exploration system 102 and utilize such information to set or adjust various controls at the SAGD production sites 204. Such controls may include, by way of example, steam allocation to different ones of the SAGD production sites 204. In some embodiments, the system management module 202 may incorporate or otherwise provide the functionality of the SAGD control exploration system 102.

SAGD production site 204-1 includes a site management module 206 and SAGD well pairs 208-1, 208-2, ... 208-M collectively referred to herein as SAGD well pairs 208. The site management module 206 may communicate with or receive control information from system management module 202 and utilize such information to set or adjust controls at respective ones of the SAGD well pairs 208. It is to be appreciated that a particular SAGD system 104 may include only a single SAGD production site, such as SAGD production site 204-1. In these and other cases, the site management module 206 may incorporate or otherwise provide the functionality of the SAGD control exploration system 102.

As shown in FIG. 2, SAGD well pair 208-1 includes an injector well 210, a producer well 212, one or more sensors 214 and one or more controls 216. The sensors 214 may be placed at various locations so as to collect information at least partially capturing a state of the SAGD well pair 208-1. Such information may be provided to the site management module 206 and on to system management module 202 for storage in historical database 106 and/or for use in SAGD control exploration system 102. Sensors 214 may include temperature sensors, pressure sensors, sub-cool sensors, flow rate sensors, flow sensors, mass flow sensor, densitometers, etc. Pressure sensors may take various forms, including bottom hole sensors, surface pressure sensors, blanket gas pressure sensors, etc. Temperature sensors may also take various forms, including thermocouples, fiber optics, distributed temperature systems (DTSs), etc. providing temperature readings across vertical and horizontal sections of a well. A DTS can provide temperature readings at intervals (e.g., one meter) along injector and producer legs of a well pair. Pressure sensors may be fewer in number relative to temperature sensors, and may be located at strategic points to measure observables of interest mentioned above. The relative numbers of temperature and pressure sensors, however, may various as desired and it is not a requirement that temperature sensors outnumber pressure sensors.

The controls 216 are adjusted based on instructions or information received from the SAGD control exploration system 102 via site management module 206 and system management module 202. Controls 216 may include valves to control the flow of steam in injector well 210 or the rate of emulsion flow from producer well 212, the pressure of injected steam, the rate at which emulsion is pumped, the emulsion pressure, the temperature of the injected steam, the allocation of injected steam to different parts of a well (e.g., heel vs. toe), etc. Valves may be manually or automatically actuated in different embodiments. Controls 216 may also include mass flow controllers, pumps, etc. In some embodiments, each well pair is controlled by a set of five continuous control variables or parameters and one discrete control variable or parameter. The continuous control parameters may include, for a given well pair, the heel steam rate, toe steam rate, heel lift gas flow, toe lift gas flow and emulsion pressure. The discrete control parameter for the given well pair may indicate whether the well is active or inactive.

Although not explicitly shown in FIG. 2, other ones of the well pairs 208 may be configured with an injector well, producer well, sensors and controls in a manner similar to that described above with respect to well pair 208-1. Also, although not explicitly shown in FIG. 2 other ones of the SAGD production sites may be configured with site management modules and SAGD well pairs in a manner similar to that described above with respect to SAGD production site 204-1. Further, while FIG. 2 shows an arrangement in which the SAGD system 104 includes sensors that are local to individual SAGD well pairs, embodiments are not so limited. In some cases, SAGD production site 204-1 may include one or more sensors that collect information common to multiple ones of the SAGD well pairs 208. In a similar manner, the SAGD system 104 may include one or more sensors that collect information common to multiple ones of the SAGD production sites 204.

In some embodiments, physics inspired values are used to express the state of a given one of the SAGD well pairs 208, a given one of the SAGD production sites 204 or the SAGD system 104 at any given time. Such physics inspired values include but are not limited to steam mass flow, temperature and pressure, emulsion mass flow and temperature, temperature along injector and producers legs of a well pair (at intervals thereof or selected regions of interest), net injected energy, integrated energy, net mass, integrated net mass, etc.

This information may be used in generating a model of the SAGD system 104, where the model comprises or otherwise utilizes one or more machine learning algorithms including but not limited to autoregressive neural networks, feedforward neural networks, random forest classifiers, support vector machines and boosted support vector machines. The autoregressive neural network or other model is trained and utilized to predict one or more future states of the SAGD system 104 from historical time series data, where the state of the SAGD system 104 is expressed in terms of one or more of the aforementioned variables or other variables described herein.

The interplay between exploration and exploitation will be described below in conjunction with the following processes associated with SAGD production optimization. In model generation, calibration and training, a predictive model of the SAGD system 104 is formed. The predictive model may take a number of forms, such as being based on first principles, data-driven statistical methods, hybrid approaches of the two, etc.

The predictive model of the SAGD system 104, regardless of how it is formed or what specific type of model it is, may be reliant on mis-specified information. The mis-specified information may be expressed as $$\hat{z} = \underset{\hat{z}}{\arg\min} T(F(z; x; \tilde{u}))$$

where z denotes parameters that determine the behavior of the predictive model of the SAGD system 104, x denotes a set of parameters including historical data and/or inferred parameters and ũ denotes a historic set of controls or values for control variables. Inferred parameters may include various information regarding the subsurface environment of the SAGD system 104, including by way of example permeability profiles derived from well logs. Various processes may be used in model generation, including history matching to determine subsurface model parameters and statistical modeling using neural networks, hidden Markov models, functional linear models, etc. The model generation process may include determining various model parameters, such as weights used in a neural network, expansion coefficients, etc.

The state of the SAGD system 104 can evolve over time, and may depend on the cumulative energy and mass inserted to the SAGD system 104. To account for these quantities in addition to raw controls and observables, physical entities including integrated total mass inserted, integrated total energy inserted, mass differential and energy differential may be approximated and fed as input to the predictive model of the SAGD system 104. The integrated total mass inserted is a measure of the integrated amount of steam inserted to the SAGD system 104 over some defined time period. The integrated total energy inserted is a measure which may be computed as the product of the inserted steam multiplied by the computed inwards enthalpy of the steam over some defined time period. The mass differential is a measure of the emulsion flow subtracted from the total injected steam, and the energy differential is a measure of the integrated approximated energy differential over the life of a well, e.g., as a product of the outwards enthalpy of the extracted emulsion subtracted from a product of the inserted mass and the inward enthalpy of the steam. These inputs can be processed using neural network software to produce an executable neural network function for each output variable.

The predictive model of the SAGD system 104, in some embodiments, may comprise or otherwise utilize a NARX neural network. Various other types of models may be used, including other models which utilize machine learning, neural networks, feed-forward networks, etc. In some embodiments, the model of the SAGD system 104 may be a multiple input-multiple output model. NARX neural networks for example, may be designed to take multiple inputs and provide multiple outputs. Described below are possible inputs and outputs for the predictive model of the SAGD system 104 which may be used in some embodiments. It is to be appreciated, however, that the inputs and outputs described below are given by way of example only and that other possible inputs and/or outputs may be used in other embodiments.

Model inputs may include, by way of example, heel steam rate, toe steam rate, cumulative injected steam and energy or integrated total mass and total energy inserted (as measured from some defined start time), gas casing pressure, emulsion pressure, mass differential, cumulative mass differential, energy differential and cumulative energy differential.

The heel steam rate and toe steam rate may be associated with a producer well or injector well at a particular SAGD well pair of a SAGD production site. The total steam rate and cumulative injected steam may refer to a SAGD production site, a SAGD well pair at a particular SAGD production site, etc. The gas casing pressure may be with reference to a producer well or injector well at a particular SAGD well pair of a SAGD production site. The emulsion pressure input may be with respect to a producer well at a particular SAGD well pair, or may refer to a group of producer wells at a given SAGD production site or SAGD production sites.

The current mass differential may be measured as a difference between material input at an injector well (e.g., steam) and material output of a producer well (e.g., emulsion) for a particular SAGD well pair at a point in time, or possibly for a group of SAGD well pairs at one or more SAGD production sites at a point in time. The cumulative mass differential or integrated total mass inserted, as described above, may be a measure of the difference between the material input at an injector well (e.g., steam) and the material output of a producer well (e.g., emulsion) for a particular SAGD well pair for a defined time period, or possibly for a group of SAGD well pairs at one or more SAGD production sites for a defined time period. The integrated total energy inserted, as described above, may be a measure of the energy of the material input at an injector well (e.g., steam) for a particular SAGD well pair for a defined time period, or possibly for a group of SAGD well pairs at one or more SAGD production sites for a defined time period.

The energy differential may be a measure of a difference between the energy of material added at an injector well (e.g., the enthalpy of steam added) and material output at a producer well (e.g., the enthalpy of the emulsion) for a particular SAGD well pair at a point in time, or possibly for a group of SAGD well pairs at one or more SAGD production sites at a point in time. The cumulative energy differential may be a measure of the difference between the energy of material added at an injector well (e.g., the enthalpy of steam added) and the energy of material output at a producer well (e.g., the enthalpy of the emulsion) for a particular SAGD well pair for a defined time period, or possibly for a group of SAGD well pairs at one or more SAGD production sites for a defined time period.

Model outputs may include, by way of example, emulsion rate, blanket gas pressure, temperature, sub-cool, heel steam pressure and toe steam pressure. The emulsion rate may be an output rate for a particular SAGD well pair, for a group of SAGD well pairs at one or more SAGD production sites, etc. The blanket gas pressure may be for an injector well of a particular SAGD well pair.

In some wells, temperature and sub-cool are measured at intervals such as every meter. In other wells, temperature and sub-cool measurements may be obtained using a single sensor. The outputs relating to temperature and sub-cool that are distributed and numerous can be divided into zones for convenience. In one embodiment they are divided into zones 1 and 2, and further into outputs A and B. Zones 1 and 2 may refer to temperature readings at particular points in a SAGD production site, a particular SAGD well pair, along the length of an injector well or producer well of a particular SAGD well pair, etc. Zones 1 and 2 may also utilize multiple temperature readings for a section or portion of the injector well or producer well of a particular SAGD well pair, or for particular sections or portions of a SAGD well pair or SAGD production site, etc. The values A and B may indicate different values for the respective zones. For example, the values A and B may indicate maximum and minimum temperatures, respectively, or the mean temperature and deviation, respectively, etc. At a given SAGD well pair, or SAGD production site, there may be hundreds or thousands of temperature measurements taken at different locations. The number of outputs relating to temperature may vary as desired for a particular implementation, such as using one zone or more than two zones. In a similar manner, the numbers of other inputs and outputs used may vary, such as for example using multiple different pressure readings for different zones or locations, etc.

The sub-cool output may be measured for a particular SAGD well pair, for a group of two or more SAGD well pairs at one or more SAGD production sites, etc. Temperature and pressure readings may be used to compute enthalpy of the output of a producer well to determine if the emulsion output is in a gas or liquid phase. The sub-cool level or threshold gives a degree or margin to prevent ingestion of steam into the producer well. Negative sub-cool refers to a situation in which the enthalpy of the emulsion is less than the enthalpy of steam, and has adverse effects such as the ingestion of sand or gravel into the producer well. A sub-cool level or threshold may be set to 10% or more in some embodiments, but is more generally set so as to obtain as much bitumen in the emulsion output without ingesting sand, gravel or other undesirable particulates into the producer well.

Heel and toe steam pressure outputs may be measured for a producer well at a particular SAGD well pair.

Following model generation, calibration and training, a process for model application may commence. Once the predictive model of the SAGD system 104 has been established, predictions for quantities of interest can be performed by prescribing a set of controls u for which the response of the SAGD system 104 is investigated. The response of the SAGD system 104 may be measured by predicting observables, which may include but are not limited to emulsion rate, temperature readings at various locations, pressure readings at various locations, etc. Controls may include but are not limited to steam rate, casing gas pressure, etc. Quantities of interest may include but are not limited to emulsion rate, temperature, pressure and composition, etc. The prediction of the quantities of interest may be expressed mathematically as follows $$q(u)=F(u;x;z)+\eta(u;x;z)+\zeta$$

where q denotes the measured quantity of interest which is linked to the prediction via the predictive model F, u are the controls, x denotes historic data, and z details the experiential design configuration in which data is collected. As the model may be mis-specified, the misspecification error which is not known is denoted by $\eta$ and other stochastic or non-correlated sources of error are denoted by $\zeta$.

Production optimization in SAGD system 104 is a process that seeks to find a set of controls for a given predictive model which optimize a function of the quantities of interest while honoring certain constraints. For the SAGD system 104, the objectives may include but are not limited to maximizing or increasing emulsion output or yield, minimizing or reducing a steam to oil ratio, maximizing or increasing a net present value, etc. Examples of constraints for the SAGD system include but are not limited to certain upper bounds on pressure such as bottom hole pressure, certain bounds on temperature such as minimum temperatures at different locations along injector and/or producer wells, sub-cool thresholds, etc. Constraints may take various forms, such as non-linear inequality constraints, bound constraints, etc. Production optimization may be expressed mathematically as follows $$\hat{u} = \underset{\hat{u}}{\operatorname{argmin}}\{J(F(u; x; z))\}, \text{ s.t. } c(F(u; z; x)) \leq 0$$

where J denotes a an objective function and c denotes the constraints.

Given the above, the dependency of the optimization problem on the predictive model of SAGD system 104 is clear. The set of model parameters z depends on historic data x, which in turn depends on the historic controls ũ. Since model misspecification error $\eta(u; x; z)$ is a function of the controls, the uncertainty associated with the selection of certain values for control variables will differ from the selection of other possible values. In some embodiments, the optimization objective is modified to accommodate or incorporate information gain associated with deliberate exploration of the predictive model control space, by balancing exploitative choice of values for control variables with explorative choice of the values for the control variables. In doing so, it is possible to mitigate the effects of the misspecified error component $\eta$, which can become particularly critical when optimization can benefit from venturing into ranges of values for control variables that the predictive model of the SAGD system 104 is not sufficiently informed upon.

Let $\hat{\eta}(u; x; z)$ denote an estimate of the uncertainty of the predictive model of the SAGD system 104 as a function of the control space u. An information gain measure $\Gamma$ can thus be defined which appraises the reduction in model uncertainty due to information regarding the value of the quantity of interest q for a given set of values for control variables. The information regarding the value of the quantity of interest q may be obtained through actual experimentation on the SAGD system 104, e.g., by adjusting the controls of the SAGD system 104 and determining the system response.

The model uncertainty, $\hat{\eta}(u; x; z)$, can be estimated using various techniques, including but not limited to Gaussian processes, response surface, measures of a Fisher information matrix (e.g., A design, D design, E design, etc.). In neural networks, as an example, model uncertainty for the SAGD system 104 may be estimated using training data and repeated predictions compared with known data.

Information gain measures may take various forms. As one example, a Bayesian measure of expected improvement may be used as an information gain measure. Expressed mathematically, the Bayesian measure of expected improvement is $$\Gamma(u) = \sigma(u)(\alpha(u)\Phi(\alpha(u)) + \phi(\alpha(u)))$$

where $$\alpha(u) = \frac{t - \mu(u)}{\sigma(u)},$$

$\mu(u)$ and $\sigma^2(u)$ are the predictive mean and variance at u, $\Phi(.)$ and $\phi(.)$ are the standard cumulative distribution function (CDF) and probability distribution function (PDF), respectively, and t is the best solution found so far. Various other types of information gain measures may be used in addition to or as an alternative to the Bayesian measure of expected improvement, including but not limited to mutual information (expected value of the Kullback-Leibler divergence) and information gain ratio.

The uncertainty quantification tool (e.g., the model uncertainty $\hat{\eta}(u; x; z)$) and the design tool (e.g., the information gain $\Gamma$) collaboratively provide representation of uncertainty of the prediction space as a function of the controls of the SAGD system 104. These tools can thus be used to guide toward a choice of values for control variables that reduce uncertainty in the predictive model of the SAGD system 104. In this context, selection of or bias towards values for control variables where uncertainty is high can lead to improved understanding of the response of the SAGD system 104 to various control inputs. Over time, controlling operation of the SAGD system 104 to explore such controls can lead to improvements in emulsion production or other objectives.

Once an information gain objective is selected, a new optimization problem for the SAGD system 104 may be formulated to balance between optimality in the exploitative sense (e.g., achieving one or more objectives such as increasing emulsion production, reducing a steam to oil ratio, increasing net present value, etc.) with optimality in the explorative sense (e.g., information gain or reducing uncertainty of the predictive model of SAGD system 104). In some embodiments, a weighting parameter β is chosen to regulate the composition of exploration and exploitation. In some embodiments, the weighting parameter may be incorporated into the production optimization framework as follows $$\hat{u} = \operatorname*{argmin}_{u} J(F(u; x; z)) + \beta \Gamma(u, \hat{\eta}(u; x; z)), \text{ s.t. } c(F(u; z; x)) \leq 0.$$

The weighting parameter β may be adjusted over time, so as to accommodate prediction horizon and maturity of the predictive model of the SAGD system 104. By way of example, initially the weighting parameter β may be selected so as to emphasize exploration over exploitation, with the value of β being gradually adjusted to emphasize exploitation over exploration as the model uncertainty is reduced. In some cases, the value of the weighting parameter β may be adjusted in response to various changes in the predictive model of the SAGD system 104, in response to changes in the SAGD system 104, etc. as will be described in further detail below.

By adjusting the value of the weighting parameter β, a goal of improved understanding of the response of the predictive model of SAGD system 104 to various controls and reduction in prediction uncertainty can be balanced with a long run ability to optimize the yield or some other objective relating to the SAGD system 104. Myopic, exploitative choices of SAGD controls or immediate gratification can thus be balanced with long-term objectives requiring enhanced exploration of the response space of the SAGD system 104 to various control values.

Figure 3:
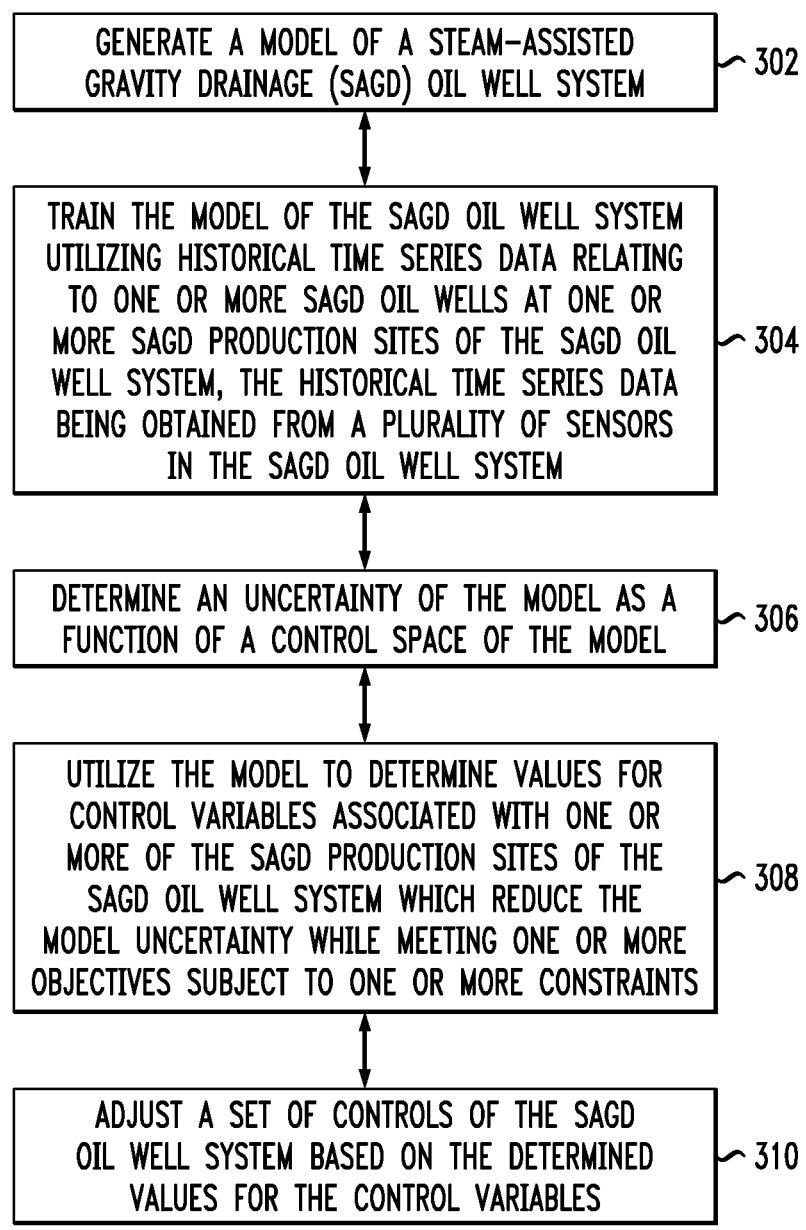
FIG. 3 depicts a process for controlling operation of a SAGD system by adjusting controls to reduce model uncertainty, according to an embodiment of the invention.

FIG. 3 shows a process 300 for adjusting controls of a SAGD system, such as SAGD system 104, to reduce uncertainty of a model of the SAGD system. SAGD control exploration system 102 may be used to implement process 300. The process 300 begins with step 302, generating a model of the SAGD system 104. In step 304, the model of the SAGD system 104 is trained utilizing historical time series data relating to one or more SAGD oil wells such as SAGD well pairs 208 at one or more SAGD production sites 204 of the SAGD system 104. The historical time series data may be obtained at least in part from a plurality of sensors in the SAGD system, such as the sensors 214 in SAGD well pair 208-1. The historical time series data may, in some embodiments, include 2-5 days of historical data relating to one or more SAGD oil wells in the SAGD system 104. In other embodiments, more or less than 2 to 5 days of historical time series data may be used.

The process 300 continues with step 306, determining an uncertainty of the model as a function of a control space of the model. In step 308, the model is utilized to determine values for control variables associated with one or more of the SAGD production sites 204 of the SAGD system 104 which reduce the model uncertainty while meeting one or more objectives subject to one or more constraints. In step 310, a set of controls of the SAGD system 104 are adjusted based on the determined values for the control variables.

In some embodiments, determining the model uncertainty in step 306 includes estimating model uncertainty using one or more of a response surface methodology, a Gaussian process and a measure of Fisher information matrix. Step 306 may further include determining an information gain measure to identify a reduction in the model uncertainty due to experimentation regarding the value of one or more quantities of interest for a given set of values for the control variables. Various measures may be used to determine information gain, including by way of example a Bayesian measure of expected improvement.

In some embodiments, steps 306, 308 and 310 of the process 300 are repeated for multiple time steps, with a weighting parameter for reducing model uncertainty being adjusted over the multiple time steps. The weighting parameter may be set based on a size of an unknown portion of the control space for the model. In other words, for a model of the SAGD system 104 with higher uncertainty, the weighting parameter may emphasize exploration of the control space rather than exploitation.

In some embodiments, the weighting parameter is set for a first time step to a first value emphasizing exploration of the control space relative to meeting the one or more objectives. Over time, the value of the weighting parameter is adjusted to emphasize meeting the one or more objectives relative to exploration of the control space as a size of an unknown portion of the control space for the model is reduced. In the example given above, the weighting parameter β is directly proportional to emphasizing exploration over exploitation, and thus the first value may be a relatively high value which is gradually reduced over time. If the weighting parameter is indirectly proportional to emphasizing exploration over exploitation, the first value may be a relatively low value which is gradually increased over time.

The weighting parameter may also be adjusted responsive to identifying one or more changes in the SAGD system 104. Such changes may include one or more of adding a new SAGD production site to the SAGD system 104, removing an existing SAGD production site from the SAGD system 104, or modifying an existing SAGD production site in the SAGD system 104. Over time, the SAGD system 104 is not necessarily static. New pads or SAGD production sites may be built, and existing pads or SAGD production sites may be closed, turned off or otherwise removed from the SAGD system 104. Changes to the SAGD system 104 may also include, by way of example, changes in the amount of steam that may be produced and allocated to different SAGD production sites and SAGD well pairs, improved equipment leading to changes in one or more constraints, etc.

Changes in the SAGD system 104 may also or alternatively include changes to one or more parameters of a subsurface model of the SAGD system 104. Such parameters may relate to permeability, porosity and thermal conductance of the subsurface model of the SAGD system 104. These parameters may change in response to new observations or data obtained from sensors in the SAGD system 104, or from new techniques or changes to the model used for the SAGD system 104.

The one or more objectives used in step 308 may include, by way of example, increasing emulsion production, decreasing a steam to oil ratio, increasing net present value, etc. Other embodiments may utilize other objectives, including combinations of two or more of these and other objectives. As an example, another objective may be to reduce the amount of steam utilized in the SAGD system 104 while maintaining a threshold emulsion production in the SAGD system 104.

The one or more constraints used in step 308 may include, by way of example, one or more threshold pressures, temperatures, sub-cool levels, etc. associated with individual injector or producer wells, with one or more SAGD well pairs 208, with one or more SAGD production sites, and/or the SAGD system 104.

Adjusting the set of controls in step 310 may include, by way of example, controlling the respective rates of steam allocated to injector wells of one or more SAGD well pairs 208 at one or more of the SAGD production sites 204 in the SAGD system 104, allocation of steam between two or more different SAGD production sites 204 in the SAGD system 104, allocation of steam between two or more different injectors wells at two or more different SAGD well pairs 208 at a given SAGD production site 204 in the SAGD system 104, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
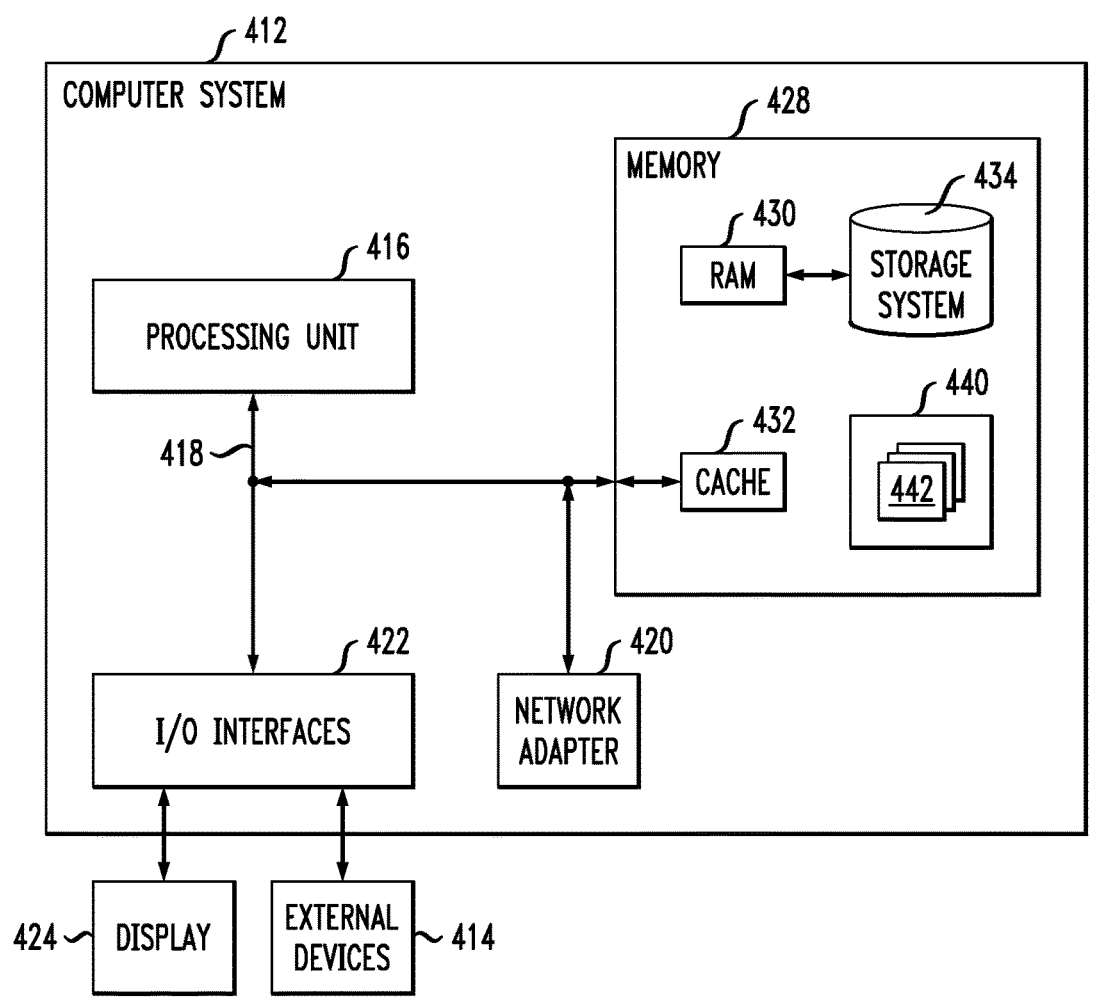
FIG. 4 depicts a computer system in accordance with which one or more components/steps of techniques of the invention may be implemented, according to an embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via I/O interfaces 422. Still yet, computer system/server 412 can communicate with one or more networks such as a LAN, a general WAN, and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
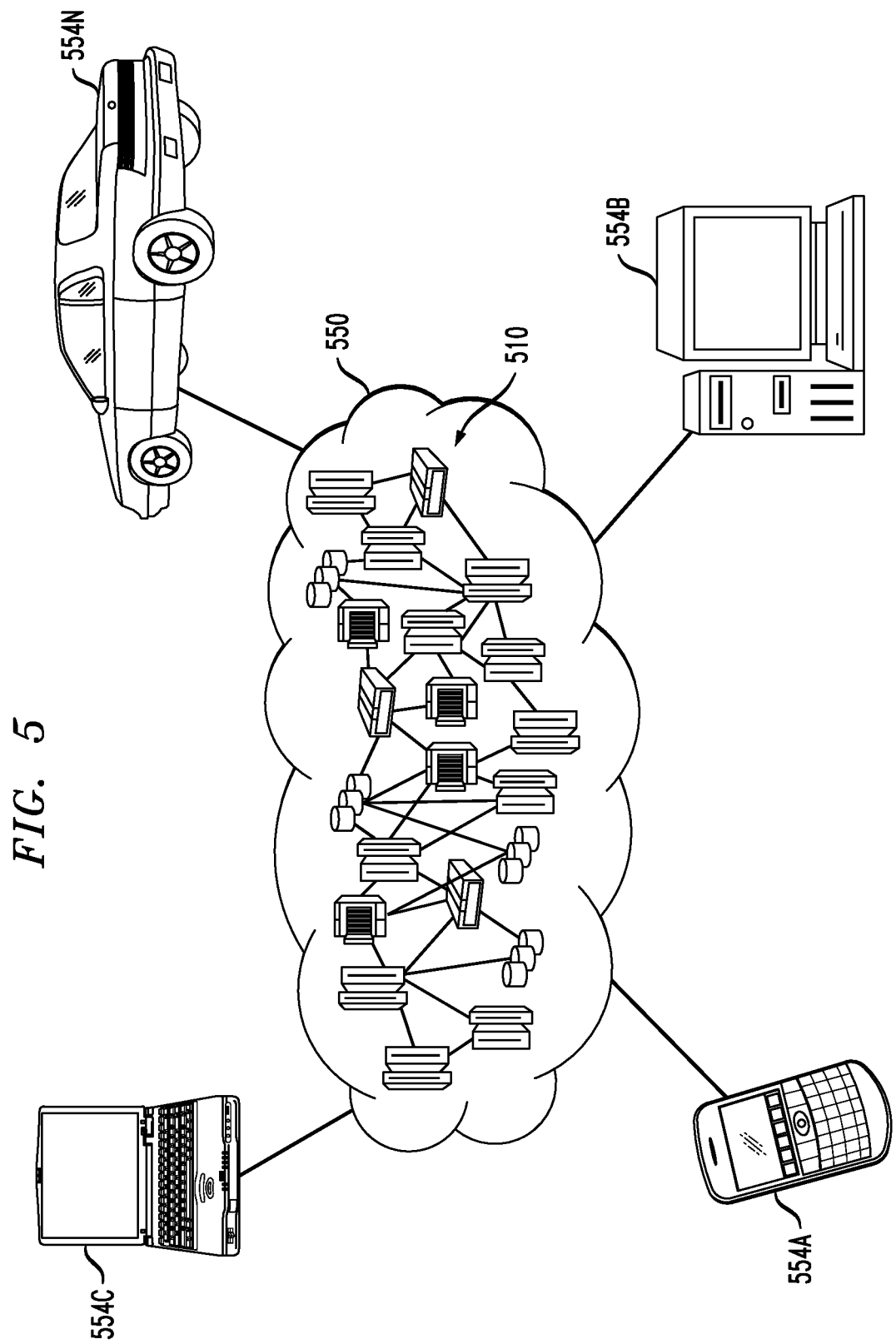
FIG. 5 depicts a cloud computing environment, according to an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
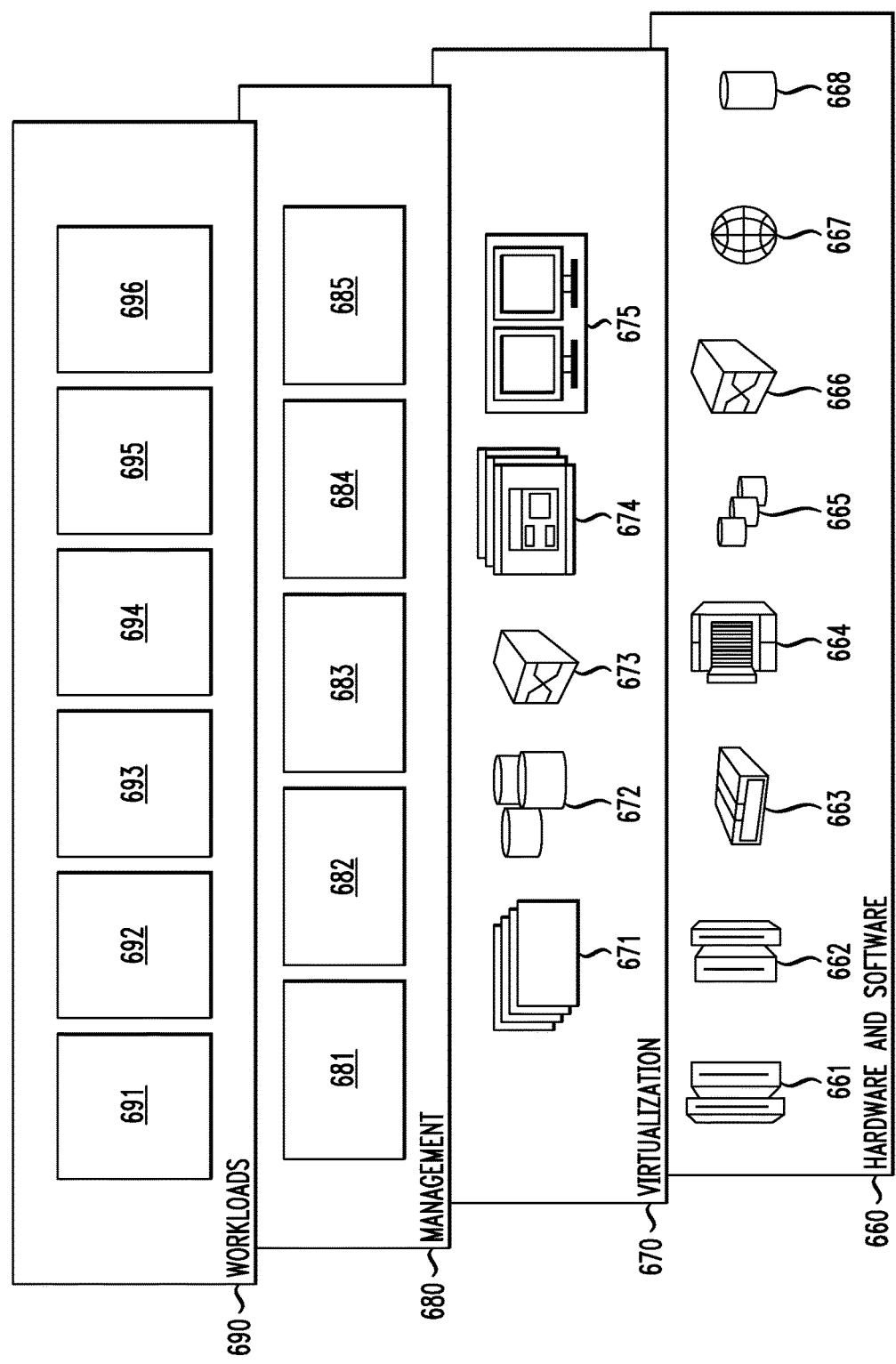
FIG. 6 depicts abstraction model layers, according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and SAGD control exploration 696, which may perform various functions described above with respect to SAGD control exploration system 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing efficiency in emulsion production for a steam-assisted gravity drainage (SAGD) oil well system comprising:
   generating a model of the SAGD oil well system;
   training the model of the SAGD oil well system utilizing historical time series data relating to one or more SAGD oil wells at one or more SAGD production sites of the SAGD oil well system, the historical time series data being obtained from a plurality of sensors in the SAGD oil well system;
   determining an uncertainty of the model as a function of a control space of the model;
   utilizing the model and a weighting parameter to determine values for control variables associated with one or more of the SAGD production sites of the SAGD oil well system which reduce the model uncertainty while meeting one or more objectives subject to one or more constraints, the weighting parameter applying relative weighting between (i) reducing the model uncertainty and (ii) meeting the one or more objectives, the control variables comprising respective amounts of steam allocated to the one or more SAGD production sites of the SAGD oil well system;
   adjusting a set of controls of the SAGD oil well system based on the determined values for the control variables;
   operating the SAGD oil well system utilizing the adjusted set of controls;
   collecting data from the plurality of sensors in the SAGD oil well system while operating the SAGD oil well system utilizing the adjusted set of controls; and
   refining the model of the SAGD oil well system to reduce the model uncertainty utilizing the collected data from the plurality of sensors in the SAGD oil well system;
   wherein the method is performed by at least one processing device comprising a processor coupled to a memory, the processing device being operatively coupled to the SAGD oil well system;
   wherein the determining, utilizing and adjusting steps are repeated for multiple time steps; and
   wherein the weighting parameter is adjusted over the multiple time steps.

2. The method of claim 1, wherein determining the model uncertainty comprises estimating model uncertainty using one or more of a response surface methodology, a Gaussian process and a measure of Fisher information matrix.

3. The method of claim 1, further comprising determining an information gain measure to identify a reduction in the model uncertainty due to experimentation regarding the value of one or more quantities of interest for a given set of values for the control variables.

4. The method of claim 3, wherein a Bayesian measure of expected improvement is used to determine the information gain measure.

5. The method of claim 1, wherein the weighting parameter is set based on a size of an unknown portion of the control space for the model.

6. The method of claim 1, wherein the weighting parameter is set for a first time step to a first value assigning a higher weight to reducing the model uncertainty relative to meeting the one or more objectives, and wherein the weighting parameter is adjusted to emphasize assign a higher weight to meeting the one or more objectives relative to reducing the model uncertainty as a size of an unknown portion of the control space for the model is reduced.

7. The method of claim 1, wherein the weighting parameter is adjusted responsive to identifying one or more changes in the SAGD oil well system.

8. The method of claim 7, wherein the one or more changes in the SAGD oil well system comprise at least one of:
adding a new SAGD production site to the SAGD oil well system;
removing an existing SAGD production site from the SAGD oil well system; and
modifying an existing SAGD production site in the SAGD oil well system.

9. The method of claim 7, wherein the one or more changes in the SAGD oil well system comprise changes to one or more parameters of a subsurface model of the SAGD oil well system, the one or more parameters being associated with one or more of permeability, porosity and thermal conductance of the subsurface model of the SAGD oil well system.

10. The method of claim 1, wherein the one or more objectives comprise increasing emulsion production in the SAGD oil well system.

11. The method of claim 1, wherein the one or more objectives comprise decreasing a steam to oil ratio for the SAGD oil well system.

12. The method of claim 1, wherein the one or more objectives comprises increasing a net present value of the SAGD oil well system.

13. The method of claim 1, wherein the one or more constraints comprise at least one of:
at least one threshold pressure for a given one of the SAGD production sites in the SAGD oil well system; and
at least one threshold temperature at the given SAGD production site in the SAGD oil well system.

14. The method of claim 1, wherein the one or more constraints comprise a threshold sub-cool level at a given one of the SAGD production sites in the SAGD oil well system.

15. The method of claim 1, wherein the set of controls comprises respective rates of steam allocated to injector wells of one or more SAGD well pairs at one or more of the SAGD production sites in the SAGD oil well system.

16. The method of claim 1, wherein the set of controls comprises allocation of steam between two or more different SAGD production sites in the SAGD oil well system.

17. The method of claim 1, wherein the set of controls comprises allocation of steam between two or more different injectors wells at two or more different SAGD well pairs at a given SAGD production site in the SAGD oil well system.

18. A computer program product for increasing efficiency in emulsion production for a steam-assisted gravity drainage (SAGD) oil well system comprising a non-transitory computer readable storage medium for storing computer readable program code which, when executed, causes a computer:
to generate a model of the SAGD oil well system;
to train the model of the SAGD oil well system utilizing historical time series data relating to one or more SAGD oil wells at one or more SAGD production sites of the SAGD oil well system, the historical time series data being obtained from a plurality of sensors in the SAGD oil well system;
to determine an uncertainty of the model as a function of a control space of the model;
to utilize the model and a weighting parameter to determine values for control variables associated with one or more of the SAGD production sites of the SAGD oil well system which reduce the model uncertainty while meeting one or more objectives subject to one or more constraints, the weighting parameter applying relative weighting between (i) reducing the model uncertainty and (ii) meeting the one or more objectives, the control variables comprising respective amounts of steam allocated to the one or more SAGD production sites of the SAGD oil well system;
to adjust a set of controls of the SAGD oil well system based on the determined values for the control variables;
wherein the SAGD oil well system is operated utilizing the adjusted set of controls;
to collect data from the plurality of sensors in the SAGD oil well system while operating the SAGD oil well system utilizing the adjusted set of controls; and
to refine the model of the SAGD oil well system to reduce the model uncertainty utilizing the collected data from the plurality of sensors in the SAGD oil well system;
wherein the determining, utilizing and adjusting are repeated for multiple time steps; and
wherein the weighting parameter is adjusted over the multiple time steps.

19. The computer program product of claim 18, wherein the weighting parameter is set based on a size of an unknown portion of the control space for the model.

20. An apparatus for increasing efficiency in emulsion production for a steam-assisted gravity drainage (SAGD) oil well system comprising:
a memory; and
a processor coupled to the memory and configured:
to generate a model of the SAGD oil well system;
to train the model of the SAGD oil well system utilizing historical time series data relating to one or more SAGD oil wells at one or more SAGD production sites of the SAGD oil well system, the historical time series data being obtained from a plurality of sensors in the SAGD oil well system;
to determine an uncertainty of the model as a function of a control space of the model;
to utilize the model and a weighting parameter to determine values for control variables associated with one or more of the SAGD production sites of the SAGD oil well system which reduce the model uncertainty while meeting one or more objectives subject to one or more constraints, the weighting parameter applying relative weighting between (i) reducing the model uncertainty and (ii) meeting the one or more objectives, the control variables comprising respective amounts of steam allocated to the one or more SAGD production sites of the SAGD oil well system;
to adjust a set of controls of the SAGD oil well system based on the determined values for the control variables;
wherein the SAGD oil well system is operated utilizing the adjusted set of controls;
to collect data from the plurality of sensors in the SAGD oil well system while operating the SAGD oil well system utilizing the adjusted set of controls; and
to refine the model of the SAGD oil well system to reduce the model uncertainty utilizing the collected data from the plurality of sensors in the SAGD oil well system;

wherein the determining, utilizing and adjusting are repeated for multiple time steps; and wherein the weighting parameter is adjusted over the multiple time steps.

* * * * *